United States Patent
Ramakrishna

(10) Patent No.: US 8,281,136 B2
(45) Date of Patent: Oct. 2, 2012

(54) TECHNIQUES FOR KEY DISTRIBUTION FOR USE IN ENCRYPTED COMMUNICATIONS

(75) Inventor: Preetam Ramakrishna, Bangalore (IN)

(73) Assignee: Novell, Inc., Provo, UT (US)

( * ) Notice: Subject to any disclaimer, the term of this patent is extended or adjusted under 35 U.S.C. 154(b) by 1015 days.

(21) Appl. No.: 11/348,669

(22) Filed: Feb. 7, 2006

(65) Prior Publication Data

US 2007/0094503 A1    Apr. 26, 2007

(30) Foreign Application Priority Data

Oct. 21, 2005   (IN) .......................... 2819/DEL/2005

(51) Int. Cl.
  *H04L 29/06*  (2006.01)
(52) U.S. Cl. ........... 713/172; 713/182; 713/185; 380/44
(58) Field of Classification Search .................. 713/172, 713/201, 182; 709/30
  See application file for complete search history.

(56) References Cited

U.S. PATENT DOCUMENTS

| | | | |
|---|---|---|---|
| 4,910,773 A | | 3/1990 | Hazard et al. |
| 5,491,752 A | * | 2/1996 | Kaufman et al. ............... 380/30 |
| 5,509,071 A | * | 4/1996 | Petrie et al. .................... 380/30 |
| 5,838,903 A | | 11/1998 | Blakely, III et al. |
| 5,894,519 A | | 4/1999 | Clemot et al. |
| 6,405,312 B1 | | 6/2002 | Ly |
| 6,742,114 B1 | | 5/2004 | Carter et al. |
| 6,760,843 B1 | | 7/2004 | Carter |
| 6,985,583 B1 | * | 1/2006 | Brainard et al. ................ 380/44 |
| 7,711,152 B1 | * | 5/2010 | Davida et al. .................. 382/115 |
| 7,818,792 B2 | * | 10/2010 | Shamsaasef et al. ........... 726/10 |
| 2003/0188193 A1 | | 10/2003 | Venkataramappa |
| 2004/0003287 A1 | * | 1/2004 | Zissimopoulos et al. ..... 713/201 |
| 2004/0167984 A1 | * | 8/2004 | Herrmann ..................... 709/229 |
| 2005/0010780 A1 | * | 1/2005 | Kane et al. .................... 713/182 |
| 2007/0101152 A1 | * | 5/2007 | Mercredi et al. .............. 713/185 |

OTHER PUBLICATIONS http://www.isi.edu/in-notes/rfc1510.txt RFC 1510 Sep. 1993 J. Kohl and C. Neuman.*
"Description of PKINIT Version Implemented in Kerberos in Windows 2000", http://support.microsoft.com/?kbid=248753, (Nov. 20, 2003),1 page.
"Kerberos: The Network Authentication Protocol", http://web.mit.edu/kerberos/www/, 2003-2005 ,1-3.
"Package: heimdal-kdc (0.6.3-13, 0.6.3-12)", http://packages.debian.org/unstable/net/heimdal-kdc, Last Modified: Tue, Oct. 4, 2005,(Copyright 1997-2005),1-3.
"Pkinit for heimdal", http://people.su.se/~lha/patches/heimdal/pkinit/, (no date listed),1-3.

(Continued)

*Primary Examiner* — Brandon Hoffman
*Assistant Examiner* — Michael D Anderson
(74) *Attorney, Agent, or Firm* — Schwegman, Lundberg & Woessner, P.A.

(57) ABSTRACT

Techniques for key distribution used with encrypted communications are provided. A shared secret associated with a principal is maintained securely and separately from the principal. If a principal is authenticated, then the shared secret is acquired from secure data store and used to encrypt a session key. An encrypted authentication token is also generated. The session key is used by the principal to encrypt communications with services and the authentication token vouches for an identity of the principal.

12 Claims, 3 Drawing Sheets

OTHER PUBLICATIONS

"PKINIT implementation", http://meta.cesnet.cz/cms/opencms/en/docs/software/devel/PKINIT.html, (No date listed),1-4.

"Windows 2000—Active Directory Overview", http://www.microsoft.com/windows2000/server/evaluation/features/dirlist.asp, (Jun. 30, 1999),1-12.

Hartman, S., "A Generalized Framework for Kerberos Preauthentication", *Kerberos Working Group, Internet Draft*, (2004),1-14.

Tung, B., et al., "Public Key Cryptography for Initial Authentication in Kerberos draft-ietf-cat-kerberos-pk-init-28", *Network Working Group Internet Draft*, http://www.ietf.org/internet-drafts/draft-ietf-cat-kerberos-pk-init-28.txt,(Sep. 12, 2005),1-28.

* cited by examiner

TECHNIQUES FOR KEY DISTRIBUTION FOR USE IN ENCRYPTED COMMUNICATIONS

RELATED APPLICATION

The present application claims priority to India Patent Application No. 2819/DEL/2005 filed in the India Patent Office on Oct. 21, 2005 and entitled "Techniques for Key Distribution for Use in Encrypted Communications," the disclosure of which is incorporated by reference herein.

FIELD

The invention relates generally to network security and more particularly to techniques for key distribution for use in encrypted communications.

BACKGROUND

Generally, network security is deployed with two different techniques for purposes of achieving principal authentication and/or for purposes of ensuring secure communications over a network.

A first technique is referred to as authentication by assertion. With authentication by assertion, an entity, which is secure and trusted with a service, asserts an identity of a principal requesting access to the service. The service trusts the entity and therefore accepts the assertion that the principal is who the principal asserts to be and grants access to the service's resources accordingly. An obvious problem with this technique is that if an attacker can feign its identity to the intermediary entity, then access to the service is easily compromised.

The second technique uses keys and encryption to authenticate principals and their communications. This particular technique can include a variety of sub-techniques. For example, public-private key pairs may be used to achieve encrypted communications. In this scenario, a principal has a public key and a private key and a service has a public key and a private key. To communicate, the principal encrypts a message with the principal's private key and the service's public key. The service decrypts the message with the service's private key and the principal's public key. Private keys are generally not communicated over the network and generally reside on specific devices or environments associated with the principals and the services. Conversely, the public keys are readily available over the network and in some cases published over the network. One problem with this technique is that a private key may be acquired by an intruder within a principal's environment, since the private key is physically available there. In many cases, the individual environments of principals are less secure and more easily attacked than enterprise environments that have firewalls, etc. If an intruder gets a private key of a principal then the intruder can pretend to be the principal over the network. Public and private keys are also not very portable, in the sense that usually the private keys are tied to a specific device of a principal, such that if the principal uses a different device to connect to a network, then the private key is not available for use in secure communications.

Another key distribution and encryption technique is referred to as Kerberos. With Kerberos a Key Distribution Center (KDC) distributes encrypted tokens and session keys to principals and services for use in communication with one another. The encryption used is based on a shared secret, such as a password. The session keys if acquired permits messages to be encrypted and decrypted. The token provides a form of added authentication by vouching for the token holder's identity.

One benefit of a Kerberos technique is that a principal does not have to continually logon to different Kerberos enabled services and thereby expose the principal's password or secret over the network unnecessarily, since with Kerberos once an encrypted token (ticket) and session key is acquired these are used to authenticate the principal and to encrypt and decrypt messages.

However with existing Kerberos techniques, the algorithm to generate the encryption and decryption is publicly available and easily acquired. Thus, if an attacker is capable of acquiring a principal's shared secret or password then acquiring the decryption of the encrypted token and the session key is straightforward. Also, to acquire the initial token (referred to as "Ticket Granting Ticket" (TGT) in Kerberos parlance) and the session key, the principal must supply a password.

Furthermore, the tokens and session keys have limited life spans, such that as a principal uses Kerberos, the password is regularly supplied to the KDC. This can create a greater likelihood that an attacker could perform an attack to acquire the password; and acquiring an encrypted session key is relatively easy. Thus, although Kerberos was designed to limit exposure of a password for authentication and secure communications, it still has problems in that the password is still being used regularly by a principal to get initial TGT's and session keys, since these items frequently expire.

Therefore, improved key distribution techniques for encrypted communications are desirable.

SUMMARY

In various embodiments, key distribution techniques are provided for encrypted network communications. More particularly and in an embodiment, a request for an authentication token is received from a principal. A secret is obtained from a secure storage associated with the principal and the authentication token is encrypted.

DETAILED DESCRIPTION

Figure 1:
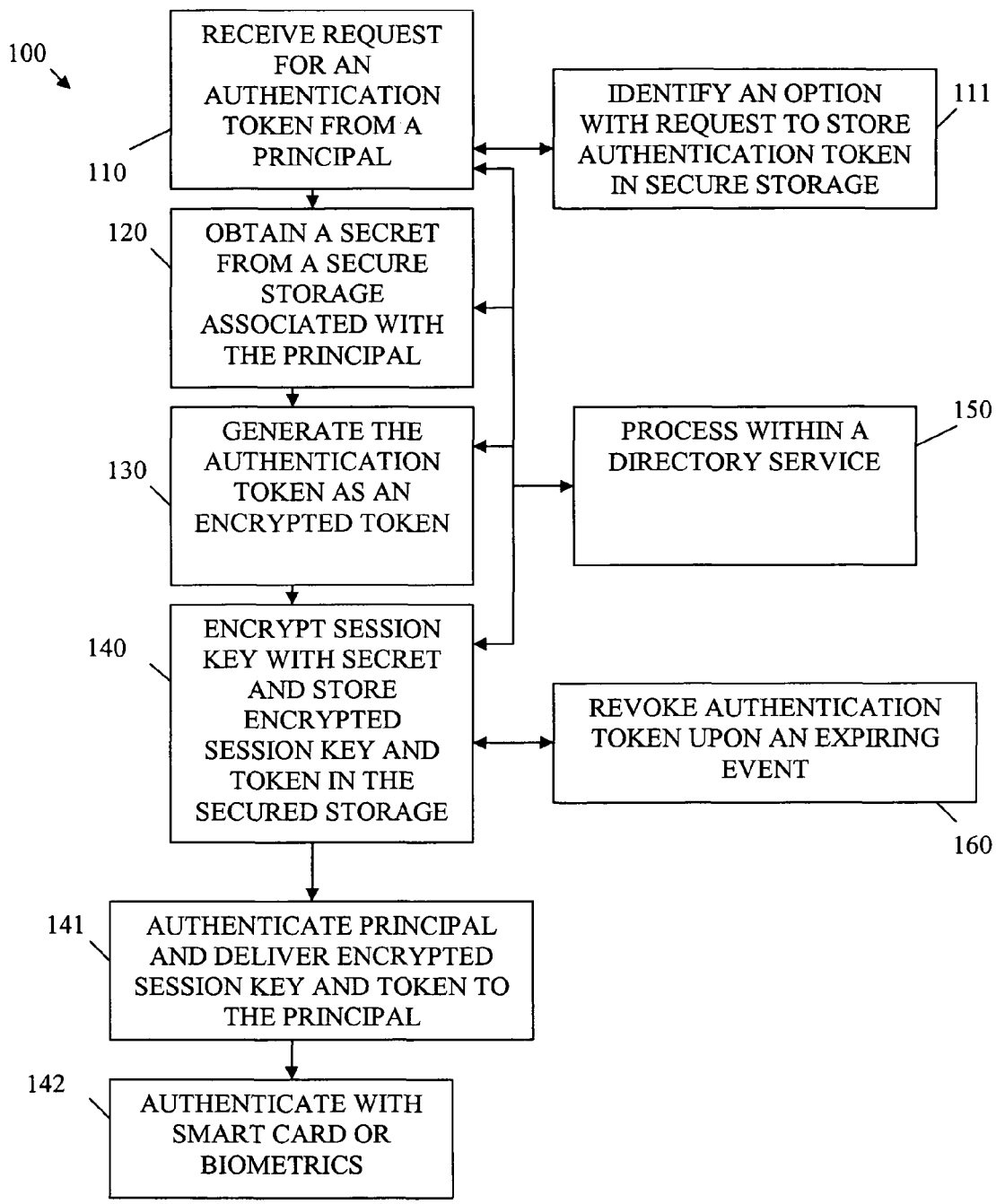
FIG. 1 is a diagram of a method for distributing a key used in encrypted communications, according to an example embodiment.

A "principal" includes an end-user, a service, an application, a system, or a device. A principal may be viewed as a logical or a physical resource represented within a machine-accessible medium. Accordingly, a resource includes a service and may also include a device or machine (e.g., printer, computer, intelligent apparel, intelligent appliance, phone, laptop, personal digital assistant (PDA) tablet personal computer (PC), network switch, hub, bridge, router, etc.). A resource may also include a user of a device or machine, a directory, or a data store (e.g., database, electronic file, data warehouse, etc.).

A "key" is electronic data that is used to encrypt and decrypt messages. A token may be viewed as a form of a key, although a token is used to provide some assurances as to an identity of a principal and is typically not used as an encryption or decryption key. A "session key" is a special type of key that is non-permanent or that is temporary. That is, a session key expires upon an event or condition, such as the expiration of a certain period of elapsed time from when the session key was initially generated and/or a detected event indicating a principal has signed out of a service, and the like. In some embodiments, an encrypted token and an encrypted session key pair combine to represent a digital certificate. The actual content of any given key or token may be of any configured length and may include randomly generated data.

In various embodiments presented herein, the techniques may be used to modify Kerberos operations such that encryption keys are generated from secrets of the principals. The secrets are maintained separate and securely from the actual principals. The techniques may also be integrated within a directory service and may represent a modified and enhanced Key Distribution Center (KDC) within that directory service. The tokens may also be referred to as Ticket Granting Tickets (TGT) and the TGT and encrypted session key pair may be viewed as a Kerberos Certificate. The TGT is encrypted with a key known to just the KDC, this permits it to be decrypted by just the KDC to verify an identity associated with the token.

Various embodiments of this invention can be implemented in existing resource or machine architectures as enhancements via network services. For example, in some embodiments, the techniques presented herein are implemented in whole or in part in the eDirectory® product, distributed by Novell®, Inc., of Provo, Utah. That is, in some embodiments, eDirectory® may be used to deploy novel services to principals and services within a network that facilitate the secure key distribution for use in encrypted communications between the principals and the services, as is described herein and below in detail.

Of course, the embodiments of the invention can be implemented in a variety of architectural platforms, operating and server systems, or applications. Any particular architectural layout or implementation presented herein is provided for purposes of illustration and comprehension only and is not intended to limit embodiments of the invention.

FIG. 1 is a diagram of a method 100 for distributing a key used in encrypted communications, according to an example embodiment. The method 100 (hereinafter "key distribution service") is implemented in a machine-access and machine-readable medium. In an embodiment, the key distribution service implements a modified and enhanced Kerberos service by separately maintaining secrets of principals in the manners discussed herein and below.

Initially, a principal decides that it wants to securely interact with another principal or with a service over a network. The network communication may be wired, wireless, or a combination of wired and wireless. To establish secure and encrypted communications with the desired target service, the principal makes a request to the key distribution service for an authentication token. The authentication token may be used by the service to vouch for the identity of the principal, such that it can assure itself that the principal is who the principal purports to be.

Accordingly, at 110, the key distribution service receives a request for an authentication token from the principal. According to an embodiment, at 111, the request may also be associated with an option supplied by the principal that indicates that any authentication token generated by the key distribution service on behalf of the principal should be maintained and managed by the key distribution service in secure storage (discussed below).

At 120, the key distribution service, in response to the request, obtains a secret from secure storage that is associated with the principal. The secure storage may be viewed as data store. The data store provides exclusive access to the principal and the key distribution service and is securely maintained and managed by the key distribution service.

In an embodiment, the secret is a password that is shared between the key distribution service and the principal. The secret may be initially obtained from the principal in a variety of manners, such as during a single and initial secure communication between the key distribution service and the principal. Alternatively, the secret may be communicated via offline techniques and entered by an administrator for the principal. The secret is not regularly communicated by the principal to the key distribution service for purposes of acquiring the authentication token; rather, once initially established it is maintained separately and securely from the principal.

In still another embodiment, the secret may not be shared between the principal and the key distribution service. In such as case, the token and session key are downloaded by the principal from the secret store having been stored there previously by the key distribution service.

At 130, the key distribution service generates the authentication token as an encryption token; the encryption technique is known to the key distribution service and the token itself vouches for an identity of the principal. In an embodiment, the encrypted version of the authentication token may be viewed as a Kerberos TGT. The secret is maintained and acquired by the key distribution service or modified KDC and not acquired from the principal directly during a same interaction as what was made by the principal for the request.

According to an embodiment, at 140, the key distribution service also generates a session key and encrypts it with the secret. The secret is known to the principal. Thus, the principal can decrypt the encrypted session key with the secret. The encrypted session key may be used by the principal to communicate with services that also use the techniques of key distribution and encryption described herein. That is, the authentication token may be used to vouch for an identity of the principal and the session key may be used to encrypt messages between the principal and a service or another different principal.

In another aspect, at 140, the encrypted authentication token and the encrypted session key may both be stored in the secure storage and associated with the principal. Thus, the key distribution service generates encryptions of the token and the session key and maintains and manages them for the principal, such that with subsequent requests they are immediately available to the principal; assuming they have not expired in which case the processing of 110-130 and/or 140 recurs.

It should also be noted, that the token and the key may also include text representing random numbers or other random information that is maintained and managed by the key distribution service, such that although a new version of the session key may include the same encryption based on the principal's secret, and the content of the token and the key are different with each new generation.

According to an embodiment, at 141, and at some later point in time the principal re-establishes communication with the key distribution service for purposes of acquiring the encrypted token and encrypted session key, which is being generated and maintained by the key distribution service.

Before the key distribution service permits this distribution, the principal is authenticated. In some cases, at 142, that authentication uses advanced techniques or mechanisms such as smart cards associated with devices being used by the principal, biometrics (e.g., face scan, fingerprints, retina scan, etc.). If properly authenticated, the key distribution service delivers the encrypted session key and the encrypted token to the principal for use by the principal to authenticate itself with other services or other principals and to encrypt communications with those other services or those other principals.

The key distribution service may be implemented in a variety of locations within a network. According, to one implementation, at 150, the key distribution service is implemented or integrated within a directory service and performs its processing from within that directory service. Other implementations may include proxies (e.g., forward, transparent and/or reverse), external and independent services, and the like.

In some embodiments, at 160, the key distribution service may detect when an expiring event takes place with a given authentication token and session key. The event may be the elapse of a predefined period of time or detection that a principal has normally or has abnormally terminated a connection to the network. In fact, any configured event that indicates via policy that a given authentication token and session key has expired can occur, which results in the key distribution service revoking the token and session key. If a token and session key are revoked then a new pair may be generated via a new request from the principal, the encryption is still be based on the maintained secret. In some cases, the principal may request that the key distribution service renew the token and the session key in a secret and secure store associated with the principal.

It is now understood how a key distribution technique may be implemented within a service to improve authentication and encrypted communications. This is achieved by defining the encryption based on a secret of a principal that is maintained and managed by the service and not regularly supplied and maintained by the principal. Additionally, in an embodiment, it has been demonstrated how the service may be integrated within a directory service and become part of a directory service associated with a principal.

Figure 2:
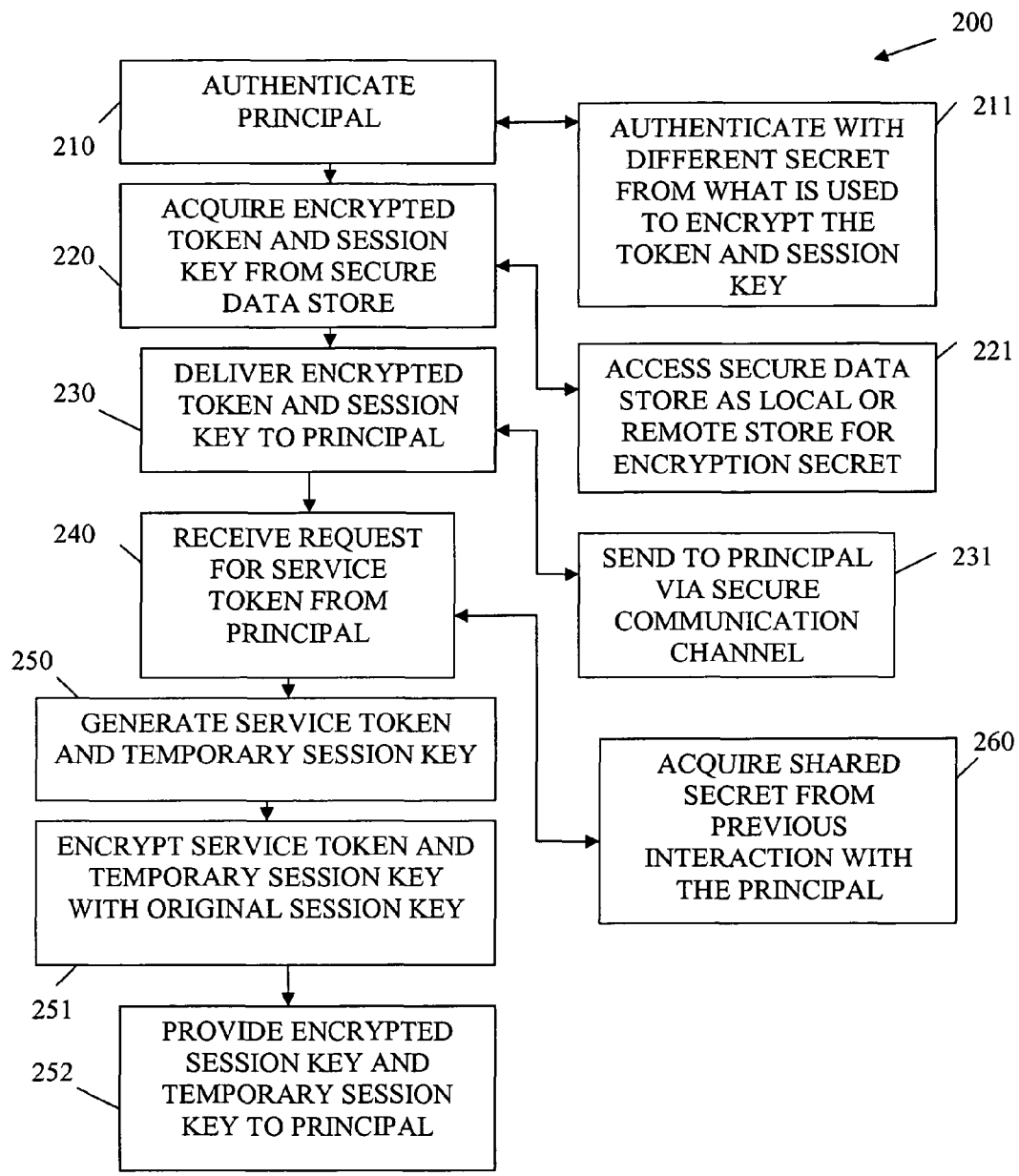
FIG. 2 is a diagram of another method for distributing a key used in encrypted communications, according to an example embodiment.

FIG. 2 is a diagram of another method 200 for distributing a key used in encrypted communications, according to an example embodiment. The method 200 (hereinafter "key and encryption service") is implemented in a machine-accessible and readable medium and is accessible over a network. The network may be wired, wireless, or a combination of wired and wireless. In an embodiment, the key and encryption service depicts more detailed processing of a key distribution service represented by the method 100 of the FIG. 1 after a token and session key are established and available for a given principal.

At 210, the key and encryption service authenticates a requesting principal. The principal desires an encrypted pair representing a token and a session key. The token is used establish an identity for the principal and the session key is used to establish an encryption for communications between the principal and other principals and/or services. It should be noted once again for purposes of illustration that a principal may be considered a service and vice versa. Thus, the terms principals and services may be used synonymously and interchangeably herein.

According to an embodiment, at 211, the key and encryption service authenticates the principal for access to the key and encryption service using a different secret from what is used to encrypt the requested session key. For example, advanced authentication may be used, such as smart card authentication or biometric authentication.

In some embodiments, the key and encryption service is integrated within another service, such as a directory service, and the authentication of the principal occurs with the directory service and established automatically between the directory service and the key and encryption service without interaction of the principal.

At 220, the key and encryption service acquires an encrypted token and session key from a secure data store. The secure data store is a secret store associated exclusively with the principal. Thus, each different principal that interacts with the key and encryption service will have its own secret data store. In some cases, the secure data store is nothing more than a secure file or storage area. In other cases, the secure data store is a database or warehouse accessible to the key and encryption service.

According to an embodiment, at 221, the secure data store may be accessed as either a local secret data store, which is local to the key and encryption service or its environment, or accessed as a remote store. For example, a separate service may be a secure and trusted service that interacts with the principal and with the key and encryption service, such that the secret may be acquired from a remote store via the separate service via secure communications between the separate service and the key and encryption service.

At 230, the key and encryption service delivers the encrypted token and the session key to the principal. This may occur, at 231, via a secure communication channel or via secure communications. Thus, the delivery may occur via techniques such as dedicated communication channels, a combination of out-of-band and in-band communications, secure protocol communications, virtual private networks, etc.

According to an embodiment, at 240, the key and encryption service may subsequently receive a request from the principal because the principal desires to communicate with another and different principal and service with custom encryption and key exchange. This can occur with Kerberos enabled services. The principal uses the encrypted token and encrypted session key as a certificate to authenticate its identity to use a service via the key and encryption service. The key and encryption service is able to decrypt the token to verify the identity of the principal for the request and is able to decrypt the session key with a secret of the principal. The token is encrypted with a key known to just the key and encryption service and the session key is decrypted with a shared secret between the key and encryption service and the principal. With this information the key and encryption service generates a new session token for the service and a new session key for the interaction between principal and the service. The communications between the principal and the service are encrypted with the new session key. The new session key is encrypted with the original session key supplied by the principal. So, the principal can acquire the new session key by decrypting the encrypted new session key with its previous session key.

At 250, the key and encryption service generates the service token and the temporary session key (new session key) for the service and, at 251, the session token and temporary session key is encrypted with the original session key of the principal. At 252, this is provided back to the principal or a client of the principal; and the principal and the service each use their secret to acquire the temporary session key. That temporary session key is then used by both the principal and the service to securely encrypt messages and communicate with one another. It should again be noted that since the service is just another form of a principal that the key and encryption service also maintains and uses a secret of the service to encrypt information for the service.

In an embodiment, at 260, the key and encryption service may have acquired the shared secret of the principal from previous and initial interacts with the principal. In other arrangements that were discussed above, the key and encryption service may never actually acquire the secret from the principal; rather, the secret is acquired from a joint trusted third-party service or secure data store. Such an embodiment was described above.

The key and encryption service elaborates in greater detail how a principal may acquire an encrypted token and session key and then subsequently use this information to interact with other services or principals. Once again to achieve this, encryption at least initially uses a secret of the principal and that secret does not have to be supplied regularly from the principal and may be maintained and acquired separately and in a secure manner from other sources than the principal. Additionally, the key and encryption service may be integrated within existing services associated with the principal, such as a directory service, proxy service, etc.

Figure 3:
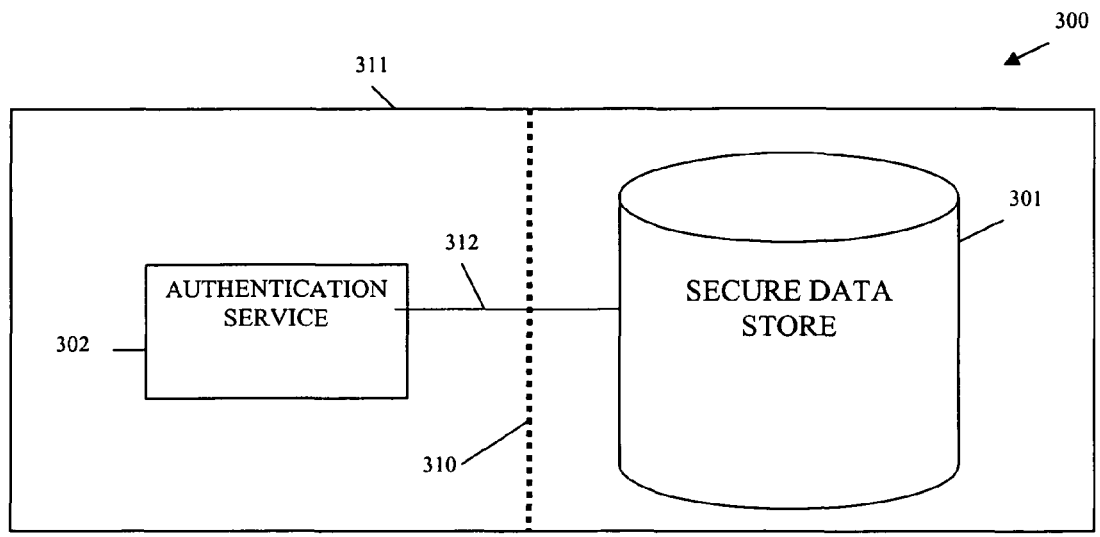
FIG. 3 is a diagram of a key distribution system, according to an example embodiment.

FIG. 3 is a diagram of a key distribution system 300, according to an example embodiment. The key distribution system 300 is implemented in a machine-accessible and readable medium and is accessible over a network. The network may be wired, wireless, or a combination of wired and wireless. In an embodiment, the key distribution system 300 implements, among other things, the methods 100 and 200 of the FIGS. 1 and 2, respectively.

The key distribution system 300 includes a secure data store 301 and an authentication service 302. It is noted that the components of the key distribution system 300 are presented for purposes of illustration and that other additional components may be used without departing from the teachings presented herein. It is also noted that the components of the system do not have to reside within the same local network 311; although they can be. That is the components of the key distribution system 300 may reside within a same network environment 311 or within a different network environment 310. The components communicate via local or external network communications over network 312. Each of the components will now be discussed in turn.

The secure data store 301 is a data store 301 that is exclusively associated with either a particular principal or a group of principals. The secure data store 301 may be logically a file maintained by the authentication service 302. Alternatively, the secure data store 301 may be a database or a data warehouse where each record is associated with a particular principal and wherein access is restricted to the authentication service.

The secure data store 301 is accessed over a network 312, that network is secure or uses secure communications. In some cases, the secure data store 301 is within a same environment 311 or local to the authentication service 302. In such a case, the network connect 312 may be insecure assuming that access to the secure data store 301 is only accessible to the authentication service 302 and the authentication service 302 is behind a firewall or other security protection mechanisms, such that access to the secure data store 301 is restricted and still secure. In alternative embodiments, the secure data store 301 is remote and in a remote environment from the secure data store 301. The separation of different and remote environments is depicted by the dotted line 310 in FIG. 3. In this particular arrangement, the network connection 312 is secure and/or uses secure communications.

The secure data store 301 includes shared secrets of the principals. The secrets are designated as shared because they are known to their respective principals and may be known or accessible to the authentication service 302 via the secure data store 301. The secret is used to initially encrypt the session key for a given principal. The authentication token permits a given principal to authenticate to another principal or service and the session key once decrypted provides a mechanism for encrypted and decrypting communications or messages between the two principals.

The initial shard secret may be acquired in a variety of manners. For example, an entirely separate service that interacts with the secure data store 301 in a trusted and secure manner may initially populate the secret on behalf of a principal. Alternatively, the principal may interact directly with the secure data store 301 and provide the secret. In still other arrangements, the authentication service 302 may during an initial and first interaction acquire the secret from the principal and store it in the secure data store 301. It is noted that if it is the principal that supplies the secret to the authentication service 302, then during this same communication the principal may not, in some embodiments, acquire the encrypted token and encrypted session key. This reduces the likelihood that the secret will be maliciously intercepted.

The authentication service 302 performs operations similar to the methods 100 and 200 of the FIGS. 1 and 2, respectively. That is, the authentication service 302 manages secrets for principals and manages encrypted tokens and session keys on behalf of the principals. The distribution of the encrypted tokens and session keys to the principals occurs in a secure and trusted manner. Moreover, revocation and expiration of a given token and session key are managed by the authentication service 302.

The authentication service 302 authenticates delivers the encrypted tokens and session keys to authenticated principals. In some cases, the authentication used is advanced authentication, such as smart card authentication, biometric authentication, and the like. Delivery of the encrypted token and session key to a given principal does not occur during a same interaction that the authentication service may receive a shared secret that is stored in the secure data store 301. That is, after the encrypted token and session key are generated the principal authenticates back to the authentication service using an entirely different secret and perhaps different authentication mechanism. If authentication occurs, then the authentication service 302 can be assured that the principal is who it purports to be and can separately and securely distribute the encrypted session key and token to the authenticated principal.

In an embodiment, the authentication service 302 is integrated and operational within a directory service. In such an embodiment, the authentication service 302 may act as a KDC for an enhanced Kerberos service, where the encryption is based on secret's maintained within the secret store 301 and not directly and concurrently acquired from a principal. The secret defines the encryption of the session key.

In still another embodiment, the authentication service 302 interacts with the principals to generate service tokens and temporary session keys. These service tokens and temporary session keys are encrypted with an original session key of a given principal and provided to the given principal so as to permit the two to encrypt communications or messages between one another with the temporary session key and decrypt the communications or messages with the same temporary session key.

Figure 4:
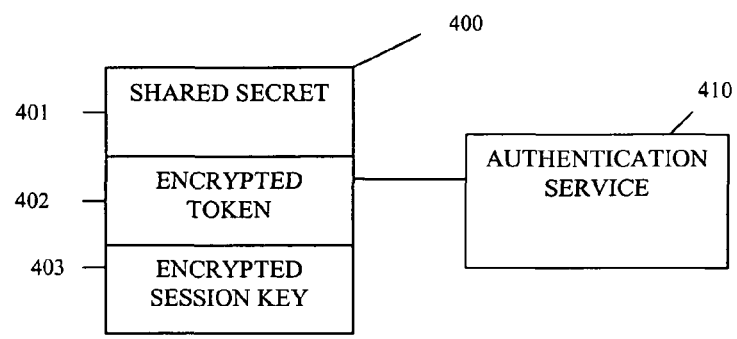
FIG. 4 is a diagram of data store used for managing key distribution used in encrypted communications, according to an example embodiment.

FIG. 4 is a diagram of data store 400 used for managing key distribution used in encrypted communications, according to an example embodiment. The data store 400 may also be logically viewed as a data structure and it is implemented in a machine-accessible and readable medium and may be optionally accessible over a network. The network may be wired, wireless, or a combination of wired and wireless. In an embodiment, the data store 400 is consumed as the secure storage or secure data store by the methods 100 and 200 of FIGS. 1 and 2, respectively. In another embodiment, the data store 400 is the secure data store 301 of the key distribution system 300 of FIG. 3.

The data store 400 includes a shared secret 401, an encrypted token 402, and an encrypted session key 403 for a given principal. The data store 400 is used and at least partially populated by an authentication service 410. The encrypted token 402 and the encrypted session key 403 are generated and populated to the data store 400 by the authentication service 401, where the token and the session key are randomly generated and managed numbers or electronic data and where the encryption format of the session key is based on the shared secret 401.

The shared secret 401 is supplied from a principal from whom it is associated. However, the manner or entity that supplies the shared secret 401 can vary. So, in some cases the shared secret 401 is supplied by a principal that directly interacts with the data store 400. In other cases, the principal uses a third-party service to provide the shared secret 401. In still other cases, the principal supplies the shared secret 401 to the authentication service 410 and the authentication service 410 populates the shared secret 401 to the data store 400 on behalf of the principal. In this latter case, the authentication service 410 may not supply the encrypted token 402 and encrypted session key to the principal during a same interaction or connection during which the principal supplies the shared secret 401.

The data store 400 may be integrated and accessible within a same environment as that which is associated with the authentication service 410. In such an arrangement, the data store 400 may be exclusively accessible to just the authentication service 410. In an embodiment, the data store 400 and the authentication service 410 may be integrated within a directory service associated with the principal, such as eDirectory® distributed by Novell, Inc. of Provo, Utah.

In other cases the data store 400 is remote from an environment of the authentication service 410 and is securely access directly of via a trusted third-party service by the authentication service 410 and the corresponding principal. Access to the data store 400 is restricted to the authentication service 410 and or the corresponding principal associated with the shared secret 401, the encrypted token 402, and the encrypted session key 403.

In some cases, the authentication service 410 enforces advanced authentication mechanisms, such as smart card authentication and/or biometric authentication, against a given principal before the encrypted token 402 and the encrypted session key is provided from the data store 400 to the principal by the authentication service 410.

The secure data store 400 permits the management of keys and tokens that are distributed to principals. This is achieved because the shared secret 401 is acquired to provide the encryption and decryption of the encrypted session key 403 from the data store 400 and not directly from the principal during an interaction where the principal also receives the encrypted token 402 and encrypted session key 403. Moreover, once the shared secret 401 is available from the data store 400 it is secure and need not be re-supplied by the corresponding principal even when the values for the tokens and session keys become stale or are revoked. This can further limit the exposure of the shared secret 401 on an open wire and reduces the likelihood that it will be compromised by an attacker or intruder.

Additionally, access to the data store 400 and access to the authentication service 410 may be integrated into existing services associated with the principal, such as a directory service of the principal. The shared secret 401 is also different from other identifying information or authentication information supplied by a principal to authenticate to the authentication service 410. Thus, this also reduces the likelihood that the shared secret 401 will be compromised.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a proxy, the method, comprising:

receiving, from a principal and by the method, a request for an authentication token, the principal already authenticated to the method when the request is received from the principal;

obtaining, by the method, from a secure storage a secret associated with the principal, access to the secure storage is exclusive to the method and the secure storage is managed by the method, the secret is not shared with the principal, the secret supplied separately to the secret storage by an administrator for the principal and entered by the administrator on behalf of the principal using offline techniques during a different interaction than that which is associated with receiving the request from the principal, the secrete storage associated exclusively with the principal by the method; and generating, by the method, the authentication token as an encrypted token, the authentication token when presented by the principal vouches for an identity of the principal when the principal subsequently interacts with the method and with other services or other principals, the other services or the other principals also interact with the method, the generated authentication token including some random information managed by the method to ensure subsequent encryption tokens generated are different in terms of their content even though a same encryption technique is being used with the encryption token and with the subsequent encryption tokens and storing the encrypted token and the subsequent encrypted tokens in the secret store.

2. The method of claim 1 further comprising:
encrypting a session key with the secret; and
storing the encrypted session key and the encrypted token in the secure storage for the principal.

3. The method of claim 2 further comprising:
authenticating the principal; and
delivering the encrypted session key and the encrypted token to the principal.

4. The method of claim 3, wherein authenticating further includes authenticating the principal using at least one of a smart card associated with a device of the principal and biometric information.

5. The method of claim 1 further comprising, processing the method within a directory service.

6. The method of claim 1 further comprising, revoking the authentication token upon an expiring event.

7. A machine-implemented method to execute on a device, the method, comprising:
automatically authenticating a principal without interaction of the principal, a separate directory service authenticating the principal separate from the method;
acquiring an encrypted version of a token and an encrypted version of a session key from a secure data store in response to authenticating the principal, the method having exclusive access to the secure data store and manages the secure data store and the secure data store, the secure data store exclusively associated with the principal, each different principal having a different secure data store that is exclusively managed by the method; and
delivering the encrypted version of the token and the encrypted version of the session key to the principal by permitting the principal via a separate interaction to download the encrypted version of the token and the encrypted version of the session key from the secure storage, the token vouching for an identity of the principal as the principal interacts with the method and the different principals, encryption is the same for the principal in subsequent sessions although content for subsequent encrypted versions of the token is different.

8. The method of claim 7 further comprising:
receiving a request for a service token from the principal, the request includes the encrypted version of the token and a message encrypted with the session key;
generating the service token and a temporary session key for interactions between the principal and a new principal;
encrypting the service token and the temporary session key with the session key; and
providing the encrypted versions of the service token and the temporary session key to the principal.

9. The method of claim 7, wherein acquiring further includes accessing the secure data store as a local secret data store associated with the principal, wherein the encrypted version of the token and the session key are encrypted with a shared secret of the principal that is maintained in the secure data store.

10. The method of claim 7, wherein acquiring further includes accessing the secure data store as a remote data store associated with the principal, wherein the encrypted version of the token and the session key are encrypted with a shared secret of the principal that is maintained in the secure data store.

11. The method of claim 7, wherein authenticating further includes authenticating the principal with different secret information of the principal from what is used to encrypt the encrypted versions of the token and the session key.

12. The method of claim 7 further comprising, acquiring a shared secret of the principal in a previous interaction with the principal and using the shared secret to generate the encrypted version of the session key, which is stored in the secure data store with the encrypted token.

* * * * *